United States Patent
Dais et al.

(10) Patent No.: US 9,238,536 B2
(45) Date of Patent: Jan. 19, 2016

(54) METHOD FOR PROVIDING CONSUMERS WITH A FOOD STORAGE KIT

(75) Inventors: Brian C. Dais, Saginaw, MI (US); Carol A. Trier-Black, Fox Point, WI (US); Zachary J. Schultz, Bay City, WI (US)

(73) Assignee: S.C. JOHNSON & SON, INC., Racine, WI (US)

( * ) Notice: Subject to any disclaimer, the term of this patent is extended or adjusted under 35 U.S.C. 154(b) by 1038 days.

(21) Appl. No.: 13/180,314

(22) Filed: Jul. 11, 2011

(65) Prior Publication Data

US 2012/0186694 A1    Jul. 26, 2012

Related U.S. Application Data

(63) Continuation-in-part of application No. 13/011,576, filed on Jan. 21, 2011.

(51) Int. Cl.
| | |
|---|---|
| *B65B 3/04* | (2006.01) |
| *B65D 75/38* | (2006.01) |
| *B65D 77/04* | (2006.01) |
| *B65D 83/08* | (2006.01) |
| *B65D 75/02* | (2006.01) |
| *B65D 33/25* | (2006.01) |
| *G06Q 50/28* | (2012.01) |
| *B65B 11/58* | (2006.01) |

(52) U.S. Cl.
CPC ............ *B65D 75/38* (2013.01); *B65D 33/2508* (2013.01); *B65D 75/02* (2013.01); *B65D 77/04* (2013.01); *B65D 83/0841* (2013.01); *G06Q 50/28* (2013.01); *B65B 3/04* (2013.01); *B65B 11/58* (2013.01)

(58) Field of Classification Search
CPC ......... B65B 3/04; B65B 11/58; B65D 71/00; B65D 77/04
USPC .......................................... 53/449
See application file for complete search history.

(56) References Cited

U.S. PATENT DOCUMENTS

| | | | | |
|---|---|---|---|---|
| 2,909,434 | A | * | 10/1959 | Patten et al. .................. 426/125 |
| 2,939,259 | A | * | 6/1960 | Heckler ............................ 53/259 |
| 3,193,392 | A | * | 7/1965 | Lundquist et al. ............. 426/124 |
| 3,381,592 | A | | 5/1968 | Ravel |
| RE27,174 | E | | 9/1971 | Ausnit |
| 4,363,345 | A | | 12/1982 | Scheibner |

(Continued)

FOREIGN PATENT DOCUMENTS

| | | |
|---|---|---|
| JP | 2001/314151 A | 11/2001 |
| WO | 8600867 A1 | 2/1986 |

OTHER PUBLICATIONS

An article entitled "How to Freeze Hamburger Patties With Seasoning", ehow.com., Mar. 4, 2010, retrieved from the internet: http://www.ehow.com/how/_5974480_freeze-hamburger-patties-seasoning.html.*

(Continued)

*Primary Examiner* — Hemant M Desai
*Assistant Examiner* — Eduardo R Ferrero

(57) ABSTRACT

A method of providing a food storage product dispensing kit for de-bulking food includes a plurality of re-sealable primary bags and a plurality of secondary pouches, wherein the secondary pouches are adapted and configured to be worn and inverted over a user's hand as well as minimize freezer burn of food items therein.

13 Claims, 4 Drawing Sheets

(56) References Cited

U.S. PATENT DOCUMENTS

| | | | |
|---|---|---|---|
| 5,009,828 A | 4/1991 | McCree | |
| RE33,674 E | 8/1991 | Uramoto | |
| 5,067,822 A | 11/1991 | Wirth et al. | |
| RE33,924 E | 5/1992 | Valeri | |
| 5,149,159 A * | 9/1992 | Bardes | 294/1.3 |
| 5,333,736 A | 8/1994 | Kawamura | |
| 5,388,699 A | 2/1995 | Ratajczak et al. | |
| 5,638,661 A * | 6/1997 | Banks | 53/469 |
| 5,704,670 A | 1/1998 | Surplus | |
| 5,772,035 A | 6/1998 | Harrison | |
| 5,804,265 A | 9/1998 | Saad et al. | |
| 6,063,416 A * | 5/2000 | Teasdale et al. | 426/115 |
| 6,194,062 B1 * | 2/2001 | Hamilton et al. | 428/343 |
| 6,371,643 B2 | 4/2002 | Saad et al. | |
| 6,611,961 B2 * | 9/2003 | Demeur et al. | 2/159 |
| 6,745,894 B2 * | 6/2004 | Dean | 206/204 |
| 6,928,793 B2 * | 8/2005 | Rutledge | 53/449 |
| 7,424,963 B2 | 9/2008 | Daniels | |
| 7,429,398 B1 | 9/2008 | Sipe | |
| 7,566,429 B2 | 7/2009 | Buelna et al. | |
| 7,908,673 B2 * | 3/2011 | Kerr-Maddox et al. | 2/163 |
| 2002/0064582 A1 | 5/2002 | Carabetta et al. | |
| 2003/0223655 A1 | 12/2003 | Faygenov | |
| 2003/0232112 A1 | 12/2003 | Whitmore et al. | |
| 2004/0093834 A1 * | 5/2004 | Rutledge | 53/449 |
| 2004/0118477 A1 | 6/2004 | Desmond | |
| 2005/0281921 A1 * | 12/2005 | Langston | A23L 3/10 426/120 |
| 2006/0078232 A1 | 4/2006 | Trinko | |
| 2007/0192927 A1 * | 8/2007 | Skelton et al. | 2/159 |
| 2008/0044114 A1 * | 2/2008 | Hall et al. | 383/103 |
| 2008/0105328 A1 * | 5/2008 | Desmond | 141/2 |
| 2008/0138477 A1 | 6/2008 | Mular et al. | |
| 2008/0175520 A1 * | 7/2008 | Simon | 383/40 |
| 2009/0034885 A1 | 2/2009 | McGruder | |
| 2009/0052809 A1 | 2/2009 | Sampson | |
| 2009/0150241 A1 | 6/2009 | Laboise | |
| 2009/0290816 A1 | 11/2009 | Nathan et al. | |
| 2010/0084880 A1 * | 4/2010 | Avilez et al. | 294/1.3 |
| 2011/0068038 A1 * | 3/2011 | Bardes | 206/524.3 |

OTHER PUBLICATIONS

An Article Entitled "How do you freeze individual hamburger patties?", Internet Discussion Board, TheGroceryGame.com, May 26, 2008, Retrieved from the Internet: http://terismessageboard.thegrocerygame.com/archive/index.php/t-66946.html.

An Article Entitled "Freezing Hambruger Patties for Convenience", Associate Content from Yahoo, Jan. 29, 2008, Retrieved from the Internet: http://www.associatedcontent.com/article/565289/freezing_hamburger_patties_for_convenience.html.

* cited by examiner

METHOD FOR PROVIDING CONSUMERS WITH A FOOD STORAGE KIT

CROSS REFERENCE TO RELATED APPLICATIONS

This application claims the benefit of U.S. patent application Ser. No. 13/011,576 filed Jan. 21, 2011, of which the present application is a continuation-in-part.

BACKGROUND OF THE DISCLOSURE

1. Field of the Disclosure

The present disclosure relates to storing food items, and more particularly, to a method for providing consumers with a kit for relatively long term freezer storage by home consumers of bulk purchased food items.

2. Background of the Related Art

Buying food items in large quantities typically provides cheaper options for consumers. Further, bulk packaging at the retail point of sale is also recognized as a more environmentally friendly delivery method. However, for perishable items, home storage and consumption before spoiling can be challenging. Despite storage in a refrigerator or even a freezer, spoilage from freezer burn and the like can reduce the benefits of bulk buying and even prevent consumers from utilizing such efficient methods.

In an effort to overcome food storage challenges, a great deal of technology has been developed. For example, vacuum bags, double layer bags, and bags with specialized preservative inner coatings have been developed to help maintain freshness and/or provide enhanced storage and protection. See U.S. Pat. No. 5,704,670 issued on Jan. 6, 1998 entitled Glove Bag; and U.S. Pat. No. 6,394,652 issued on May 28, 2002 entitled Flexible Bags Having Stretch-To-Fit Conformity To Closely Accommodate Contents In Use. Also see U.S. Patent Application Publication Nos. 2002/0064582 published on May 30, 2002 entitled Shelf Stable Food Product And Mix Kit; 2003/0232112 published on Dec. 18, 2003 entitled Packaging System Assembly For Cagy-Out Food; and 2005/0281921 published on Dec. 22, 2005 entitled Multiple-Option Meal Kit.

SUMMARY OF THE INVENTION

Effectively marketing kits to de-bulk food items is partially dependent upon consumer acceptance. By providing the necessary items as a kit, the de-bulking process is made easier and more convenient. Hence, consumer acceptance is more likely. By further providing a unified package with an advertising insert having indicia such as branding information, coupons, helpful information and instructions, consumers are more likely to adopt a practice of bulk purchases with at home de-bulking for freezer or other long term storage.

The subject technology presents a kit to provide consumers with an easy and efficient method for preparing bulk or large quantities of food items as smaller portions. The subject technology is directed to smaller bags for holding smaller portions of the food items with a larger bag for holding the filled smaller bags.

In one embodiment, the subject technology is directed to a food storage product dispensing kit including a first package having at least two re-sealable primary bags, and a second package having at least four secondary bags. A volume of two secondary bags is less than a volume of each primary bag. The first and second packages are unitized by over-wrapping the first and second packages together. The food storage product may further include an advertising insert. The primary bags can be gallon sized and the secondary bags can be 8 inches wide by 11.5 inches deep.

Another embodiment is directed to a food storage product dispensing kit including a first package comprising at least two re-sealable primary bags, a second package comprising at least four secondary bags, wherein an expanded volume of two secondary bags is less than an expanded volume of each primary bag, and over-wrapping on the first and second packages to create a unitized product. An advertising insert can be included as part of the kit and the secondary bags can have a printed area for writing information thereon related to food therein.

Still another embodiment is directed to a food storage kit including a package having a plurality of small bags for storing food items, and at least one large bag having a sealing zipper and defining an interior for storing at least two of the small bags having the food items therein. The package is unitized by sealing the plurality of small bags and at least one large bag in a container. Preferably, the plurality of small bags are dispensed one bag at a time from a coffin box. In another embodiment, the small bags are dispensed from a roll. The small bags are sized and configured to be worn like a glove to pick up food, then turned inside for storage of food therein. To minimize freezer burn, the plurality of small bags have an inherent dinginess. In one embodiment, the small bags may be stretch bags for clinging to the food items therein. The at least one large bag can also be designed to minimize freezer burn.

The container is variable such as a box, a bag, two boxes, a plurality of boxes, two joined boxes, two over-wrapped boxes, a plurality of joined boxes, a plurality of over-wrapped boxes, a container with indicia as well as compartments, two bags, a plurality of bags, and combinations thereof. One version of the container includes an insert containing instructions for using the kit and advertising information, a first coffin box for containing at least one large bag, and a second coffin box for containing the plurality of the small bags, wherein the container is over-wrapped about the insert, which at least partially surrounds the first and second coffin boxes.

Yet still another embodiment is directed to a portioning kit for food storage including a thick outer bag with a sealing zipper for storing a large amount of food, a plurality of thinner bags, the thinner bags being designed to cling to food, thereby minimizing freezer burn, and a package defining an interior having the thick outer bag and the plurality of smaller bags sealed therein. The smaller bags do not need a sealing zipper. The thin bags can be arranged as a perforated roll and the package is a box for containing the perforated roll and the thick outer bag. Preferably, there are a plurality of thick outer bags and the package is a first box for containing the plurality of thick outer bags and a second box for containing the plurality of thinner bags.

Another embodiment is directed to a food storage product dispensing kit for de-bulking food including a plurality of re-sealable primary bags and a plurality of secondary pouches, wherein the secondary pouches are adapted and configured to be worn and inverted over a user's hand as well as minimize freezer burn of food items therein. An advertising insert may include branding information, de-bulking instructions, food safety information, a product sample, and a coupon. The bags, the pouches, and the advertising insert are unitized in a single package for consumer convenience.

It should be appreciated that the present technology can be implemented and utilized in numerous ways, including without limitation as a kit, a process, an apparatus, a system, a device, and a method for applications now known and later developed. These and other unique features of the technology disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

Figure 1:
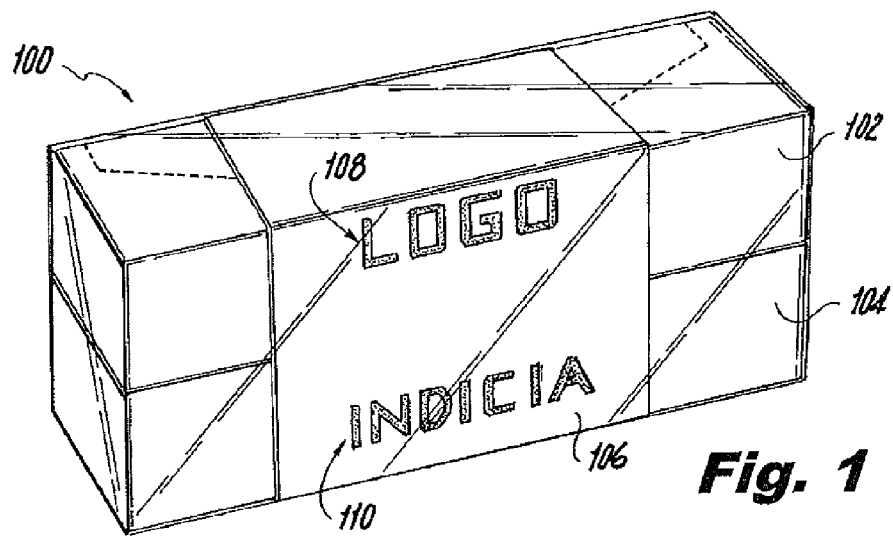
FIG. 1 is a perspective view of a kit having two coffin boxes in a stacked relationship with an advertising insert, unitized for retail sale in accordance with the subject technology.

The present disclosure overcomes many of the prior art problems associated with de-bulking food items for long term storage and the like. The advantages and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Unless otherwise specified, the illustrated embodiments can be understood as providing exemplary features of varying detail of certain embodiments, and therefore, unless otherwise specified, size, shape, features, components, modules, elements, and/or aspects of the illustrations can be otherwise modified, combined, interconnected, sequenced, separated, interchanged, substituted, positioned, and/or rearranged without materially departing from the disclosed systems or methods. It is also noted that the accompanying drawings are somewhat idealized in that, for example without limitation, only one possible version of many is shown as would be appreciated by those of ordinary skill in the pertinent art.

Referring now to FIG. 1, a perspective view of a kit 100 for de-bulking food items is shown. The kit 100 may include any number of coffin boxes 102, 104 in a stacked relationship. The boxes 102, 104 may be adhered together or even a single box with various components inside. Two boxes 102, 104 are shown for holding different bags, which facilitates manufacturing processes and providing alternative and additional bags in additional boxes sold separately or as part of a similar kit.

An advertising insert 106 helps present a unified appearance when the boxes 102, 104 and insert 106 are packaged together for retail sale as a unitized kit 100. Over-wrapping such as with clear shrink wrap (not shown explicitly) can be used to package the boxes 102, 104 and insert 106. The advertising insert 106 would typically include branding information 108 such as a logo and additional indicia 110. The indicia 110 would typically include coupons for additional storage bags or kits, helpful information such as proper food handling techniques to avoid salmonella poisoning, nutritional information, instructions on how to use the kit 100 and the like to help and encourage consumers adopt a practice of de-bulking items with the kit 100.

Figure 2:
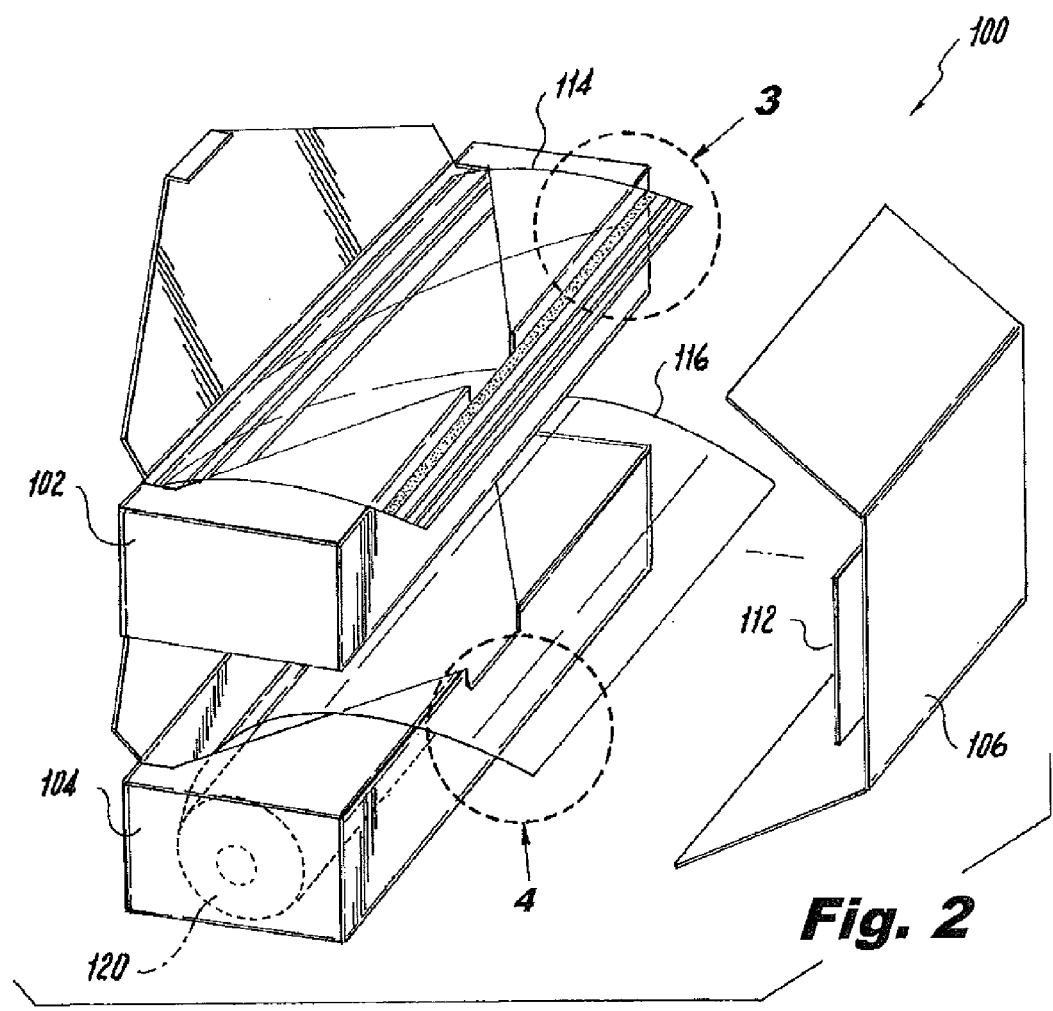
FIG. 2 is a perspective view of the two coffin boxes and advertising sheet of FIG. 1 separated and opened to show the items contained therein.

Referring now to FIG. 2, a perspective view of a kit 100 separated and opened to show the items contained therein is illustrated. The kit 100 includes an additional item 112 as a supplement to the advertising insert 106. It is also envisioned that the additional item 112 could be a plurality of items such as a sample of an additional product like an alternative bag, one or more coupons, a recipe, a survey, a sweepstake ticket possibly tied to an Internet site with a code, or other items that may be unitized along with the boxes 102, 104.

The kit 100 includes a plurality of closure or zipper bags 114 stored in the coffin box 102. The closure bags 114 are stacked and folded into the coffin box 102. In one embodiment, the closure bags 114 are ZIPLOC® DOUBLE-GUARD® double layer freezer gallon bags available from S.C. Johnson & Son, Inc. of Racine, Wis. The closure bags 114 may be any size such as gallon or quart sized.

Figure 3:
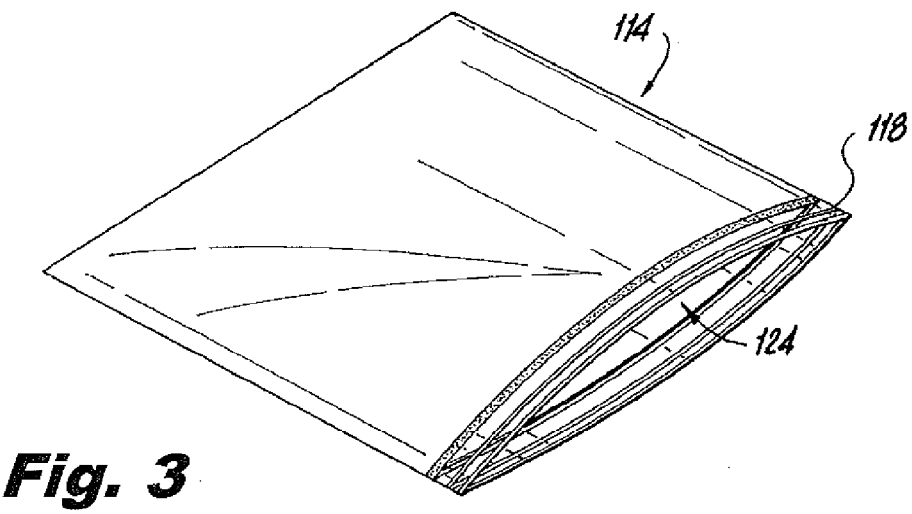
FIG. 3 is a perspective view of the bag shown in circle 3 of FIG. 2, wherein the bag includes a zipper.

As best seen in FIG. 3, the closure bags 114 include a zipper 118 or other locking mechanism adjacent the mouth or opening 124 to selectively seal contents therein as is well known in the art. The subject technology is also particularly well-suited to use double zipper mechanisms such as shown in U.S. Pat. No. 7,137,736 issued on Nov. 21, 2006 to Pawloski et al. and U.S. Pat. No. 7,410,298 issued on Aug. 12, 2008 also to Pawloski, each entitled "Closure Device for a Reclosable Pouch" and incorporated herein by reference in their entireties. The closure bags 114 may also be single walled bags. Exemplary thickness for such closure bags 114 is about 0.0016 inches {0.00406 cm}.

Referring again to FIG. 2, the kit 100 also contains a plurality of a relatively thinner pouches 116 stored in the coffin box 104. The thinner pouches 116 provide excellent adherence to items placed therein such that a closure mechanism is optional. A relatively larger number of the pouches 116 are provided on a perforated roll 120 for easy dispensing from the coffin box 104.

The boxes 102, 104 may be permanently adhered together or formed as a single box with two compartments so that the bags 114 and pouches 116 remain coupled throughout the life of the kit 100. In another embodiment, the bags 114 and pouches 116 are provided in a retail shelf bag, which is printed with branding information, instructions and the like. The bags 114 and pouches 116 could still be provided in boxes 102, 104 within the retail shelf bag or even in additional bags that may also be suitable for food storage.

Figure 4:
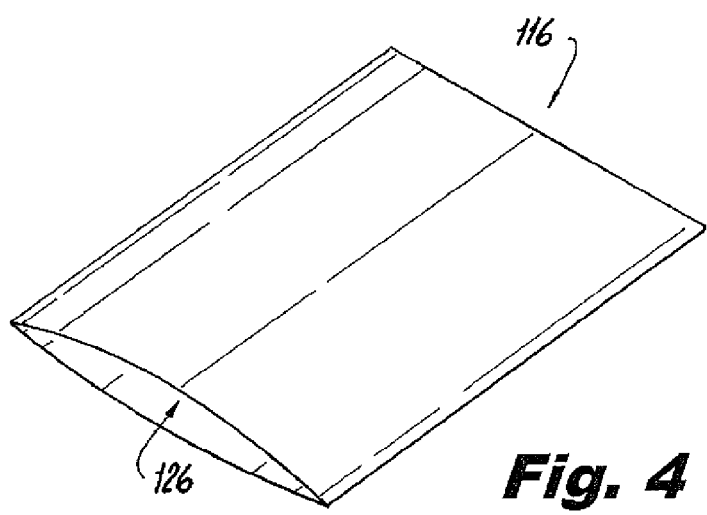
FIG. 4 is a perspective view of the pouch shown in circle 4 of FIG. 2.
Figure 5:
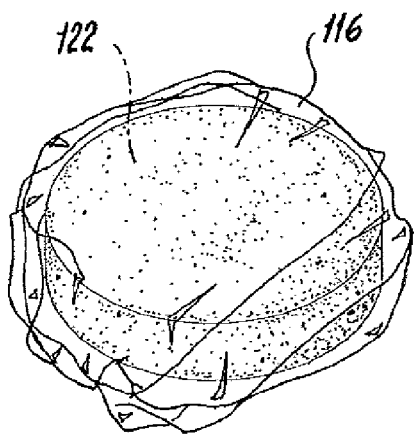
FIG. 5 is a perspective view of the pouch of FIG. 4, containing a hamburger patty.

Referring now to FIG. 4, a perspective view of a pouch 116 shown in circle 4 of FIG. 2 is illustrated. The pouch 116 is preferably fabricated from a thin film so that the pouch 116 will conform and cling to items placed therein and itself as shown in FIG. 5. By clinging to the stored items, the detrimental effects of long term storage such as freezer burn are reduced and alleviated.

Exemplary film thickness for the pouch 116 ranges from about 0.0002 inches {0.00051 cm} to about 0.0016 inches {0.00406 cm}. Preferably, the film thickness is about 0.0004 inches {0.00102 cm}, which provides excellent dinginess and protection without excessive cost. When the pouch 116 conforms well to the food item, freezer burn is minimized. In one embodiment, the pouch 116 is fabricated from an embossed film. Embossed pouches 116 provide relatively better clinginess and release of most food items. Additionally, the pouches 116 may be treated with an inner coating (e.g., silicone, Teflon and the like) or a slip additive in the film resin to ease unwrapping food items.

The De-Bulking and Storage Process

Upon buying the kit 100 and some bulk food item(s), users may divide the bulk food into smaller portions or single servings to be inserted into the pouches 116. In one example, the user purchases a kit 100 and a four pound package of ground beef to be formed into eight half pound servings of hamburger patties. Referring now to FIG. 5, a perspective view of a pouch 116 from the kit 100 is shown containing one of the hamburger patties 122.

The pouch 116 is sized and configured to fit over the typical users hand. Thus, a user may form the hamburger patties, clean their hands, and invert the pouch 116 over their hand. The user may also portion the bulk hamburger by wearing the pouch 116 as a glove and form the patties within the pouch after inverting the pouch 116 about the portion. The pouch 116 may have a lip offset at the opening 126 to make opening easier. Using the pouch 116 as a glove, the user can pick up a single hamburger patty 116, then slide the pouch 116 over their hand and the hamburger patty 122 to enclose the hamburger patty 122 in the pouch 116 without again coming into contact with patty 122. The pouch 116 can then be tightly wrapped or stretched about the hamburger patty 122 to completely enclose, cling to and protect the hamburger patty 122 as shown in FIG. 6.

In one embodiment, the pouch 116 is eight inches wide and eleven and a half inches deep. The eight inches of width provides ample room to invert the pouch 116 over one's hand while still being able to easily invert the pouch 116 over a grasped item. The eleven and a half inches of depth provides sufficient interior room to completely enclose even large items such as a small roast or a plurality of items such as chicken or turkey breasts. The pouches 116 could vary in any size such as, in width, from six to nine inches and, in depth, from seven to fourteen inches. Preferred sizes for the pouch 116 include: 9 inches of width by 7, 9, 11.5 or 13.5 inches of depth; 8 inches of width by 7, 9, 11.5 or 13.5 inches of depth; 7 inches of width by 7, 9, 11.5 or 13.5 inches of depth; and 6 inches of depth by 7, 9, 11.5 or 13.5 inches of depth.

Figure 6:
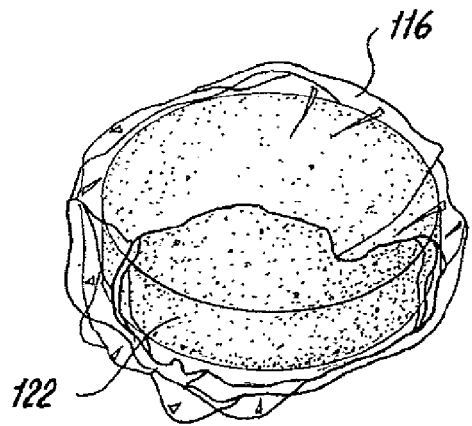
FIG. 6 is similar to FIG. 5 but shown in partial cutaway to illustrate the patty as hilly contained within the pouch.

Still referring to FIGS. 5 and 6, since the pouch 116 is typically formed from a think HDPE film or a stretchy cling film, the pouch 116 adheres to itself such that a further closure mechanism is not necessary. However, the pouch 116 could have a zipper as noted above or other interchangeable closure mechanism like a slider zipper, hook and loop closure, an adhesive closure, magnetic closure etc. In one embodiment, the pouch 116 has a foldover cuff as is commonly seen on sandwich bags.

Figure 7:
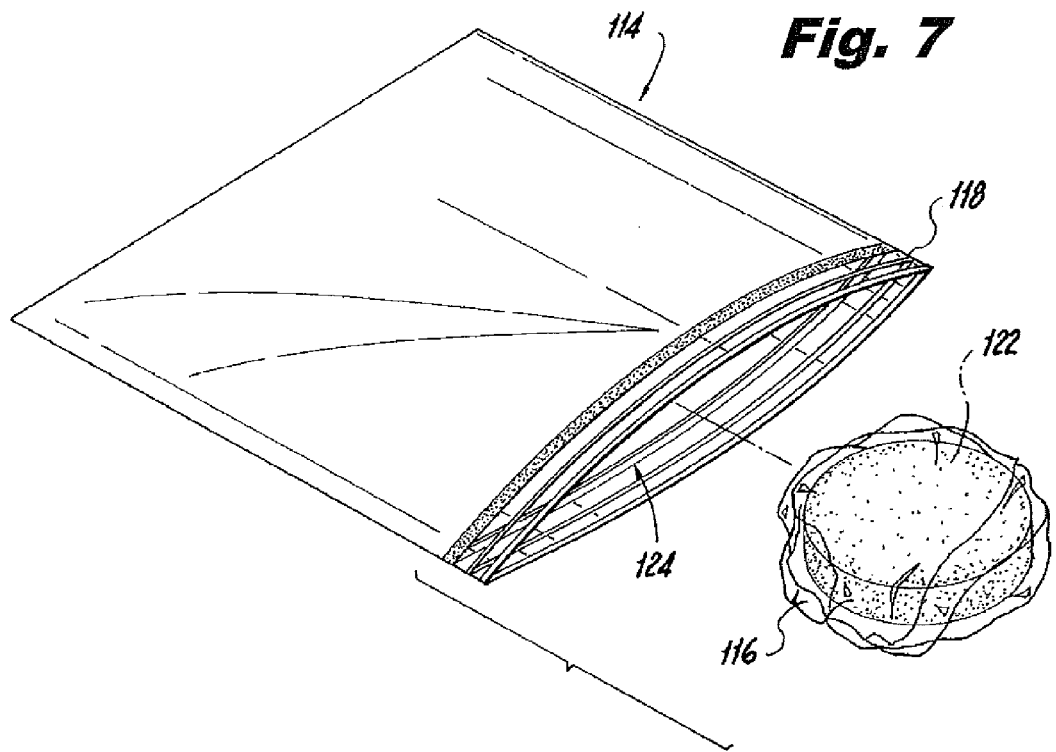
FIG. 7 is a perspective view of the wrapped patty being received within the bag for long term storage.
Figure 8:
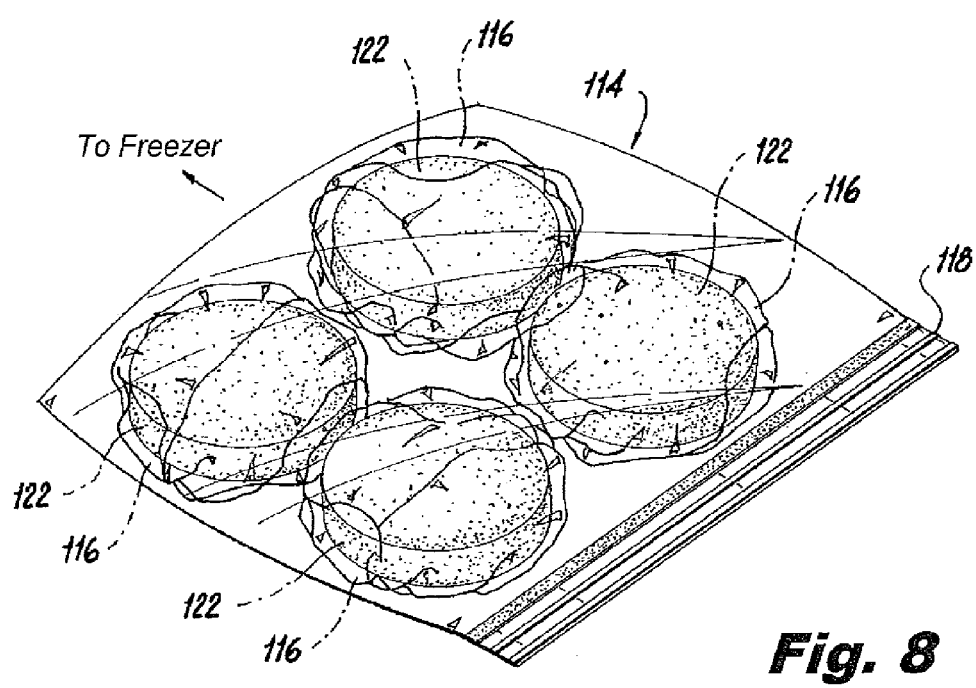
FIG. 8 is a perspective view of the bag containing a plurality of wrapped patties, staged for long term storage within a freezer.

Referring now to FIG. 7, once the hamburger patty 122 is wrapped in the pouch 116, the wrapped patty 122 is placed with the bag 114 for long term storage. The bag 114 is sized and configured to hold a plurality of bulk items that have been proportioned down into the pouches 116. As shown in FIG. 8, a plurality of wrapped patties 122 have been placed and sealed with the bag 114 for long term storage within a freezer. Once frozen, the hamburger patties 122 will be prevented from freezing together because of the individual wrapping in the pouches 116. In a four pounds of ground beef example, the bag 114 would hold eight half pound patties 122, each wrapped individually in a pouch 116. After freezing, one or more patties 122 can be removed for defrosting and subsequent consumption while resealing the bag 114 and returning the remainder to the freezer.

As would be appreciated by those of ordinary skill in the pertinent art, the subject technology may utilize any type of bag, pouch, package, box and various other storage containers to form a kit with particular advantages for certain sizes and configurations. For example, the bags 114 and pouches 116 may include a write-on label or printed area for documenting the contents and date of storage. The bags 114 and pouches 116 could also include lip lines, pleating, grip strips, and other features to enhance the performance thereof. The bags 114 and pouches 116 could be fabricated from polyethylene (PE), low-density PE (LDPE), high-density PE (HDPE), ecologically friendly PE such as from sugarcane ethanol and the like. Ideally, the bags 114 and pouches 116 are flexible even when frozen, inexpensive to manufacture, and microwavable in addition to the features noted above. In one embodiment, the bags 114 and pouches 116 are packaged in a bag that can itself be used as a re-sealable storage bag for the pouches 116. In another embodiment, the bag 114 and/or the pouch 116 are provided with a mechanism to extract air from the respective contents after closing.

Kits in accordance with the subject technology may utilize any combination of bags, pouches and packaging now known and later developed. For example, the bags 114 and pouches 116 may be gallon, quart or some other size. Typically, the pouches 116 are relatively smaller than the bags 114 so that the bags 114 may hold a plurality of relatively full pouches 116. Accordingly, a typical kit 100 will include more pouches 116 than bags 114. In one line of kits 100, ten, twenty or thirty bags 114 in a box 102 are unitized with sixty, one hundred twenty or one hundred fifty pouches 116 in a box 104, respectively. Supplemental boxes of additional bags 114 and pouches 116 of various quantities and sizes may be sold separately or additionally unitized into kits of three or more boxes. Common counts for bags 114 and pouches 116 are anywhere from 10 to 200. Generally, the kits will include at least a first bag for storing a plurality of pouched items as well as a plurality of pouches for storing food items therein to be placed in the first bag. An advertising insert and other items along with wrapping unitize these items and provide information to assist with consumer acceptance.

In view of the above, the novel features of kits in accordance with the present technology advantageously provide an extremely convenient and efficient way for consumers to take enhanced benefit from bulk purchasing of food items by properly and easily storing some or all of the bulk purchase and avoiding waste.

Method of Using the Kit

Figure 9:
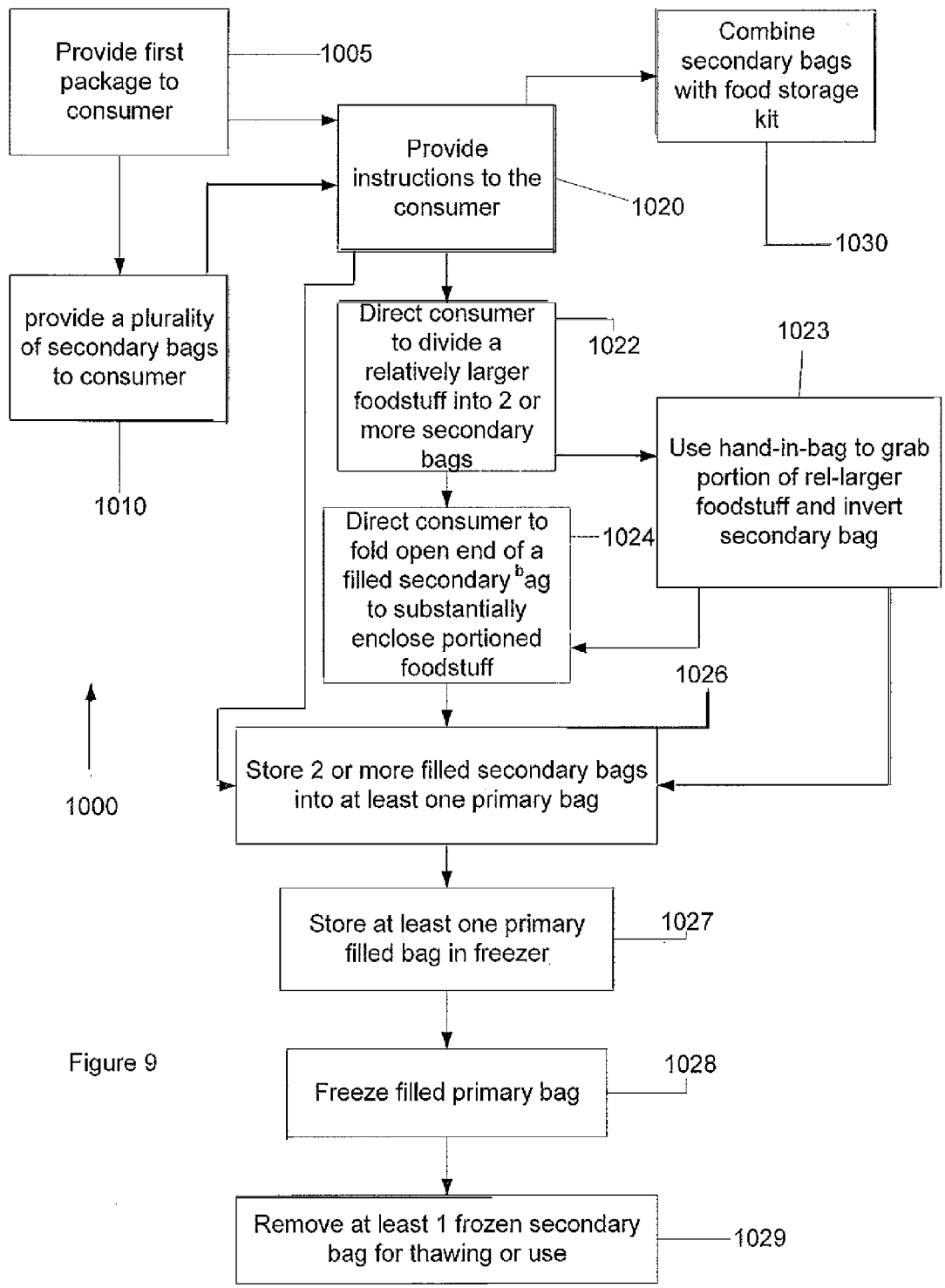
FIG. 9 is a flowchart describing a method for providing food storage kits to a consumer.

FIG. 9 provides a flowchart which generally provides steps for a method by which a producer of such a food storage kit 1000 as is described herein may provide such kits to a consumer.

A producer of plastic bag may provide a first package to a consumer 1005. In some embodiments, the first package comprises at least two re-sealable primary bags. The producer may then provide a plurality of secondary bags 1010 to the consumer. The provider may then optionally provide a set of instructions to the consumer 1020. In certain embodiments, the set of instructions (i) directs the consumer to put a portion of, or otherwise divide, a larger foodstuff into two or more second or more secondary bags 1022. In some embodiments, the set of instructions (ii) optionally directs the consumer to fold an open end of a filled secondary bag to substantially enclose the portion of foodstuff 1024. In certain other embodiments, the set of instructions (iii) directs the consumer to further store the two or more filled secondary bags into at least one primary storage bag 1026 to provide a filled, sealed primary storage bag or combined unit; and (iv) store the at least one filled primary storage bag or combined unit into the consumer's freezer 1027. As described herein, in certain nonlimiting embodiments the gauge of the secondary bags is less than the gauge of the primary bags. In certain other nonlimiting embodiments, the plurality of secondary bags is provided in the first package, although in other embodiments the plurality of secondary bags is provided in a second package.

In another embodiment, the producer may provide a first package to the consumer 1005. The first package may comprise at least two re-sealable primary bags. Again, the producer may then provide the consumer with a plurality of secondary bags 1010 and then provide the consumer with a set of instructions 1020 wherein the instructions: (i) direct the consumer to put a portion of a larger foodstuff into two or more secondary bags to provide filled secondary storage bags 1022; (ii) direct the consumer to combine the filled secondary storage bags with at least one primary storage bag to provide a filled primary storage bag or combined storage unit 1026; (iii) direct the consumer to freeze the filled primary storage bag or combined storage unit 1027; (iv) freeze the filled primary storage bag or combined unit 1028; and (v) direct the consumer to remove one or more frozen filled secondary bags for thawing 1029. In certain embodiments the instructions (i)(1) direct the consumer to substantially cover the portion of foodstuff with secondary bag after step (i) 1022 and before step (ii) 1024. In other embodiments, the set of instructions (o) directs the consumer to place the consumer's hand inside a secondary bag, grab a portion of foodstuff with the outside of the secondary bag, and inverting or reversing the inside of the secondary bag with the outside of the secondary bag 1023 as described in greater detail herein.

In yet another embodiment, the producer may provide the consumer with a plurality of secondary bags 1010 and then provide the consumer with a set of instructions 1020. In this embodiment, the instructions may direct the consumer to combine the plurality of secondary bags with a food storage kit 1030 wherein in an embodiment, the food storage kit comprises a first bag and at least two secondary bags. In other embodiments, the food storage kit comprises at least one primary bag.

INCORPORATION BY REFERENCE

All patents, published patent applications and other references disclosed herein are hereby expressly incorporated in their entireties by reference.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A method of directing and communicating home-storing bulk food to consumers by providing a food storage kit and a set of instructions provided to consumers, the method comprising the steps of:
   a. using a first package, wherein the first package contains at least two re-sealable primary bags;
   b. using a plurality of secondary bags from a second package, wherein the secondary bags have an open end and a gauge of the secondary bags is from about 0.0002 inches {0.00051 cm} to about 0.0016 inches {0.00406 cm} such that the secondary bags are clingy to reduce captured air;
   c. creating portions of a larger foodstuff in two or more of the secondary bags by placing a consumer's hand inside a secondary bag, grabbing a portion of the larger foodstuff with an outside of the secondary bag, reversing an inside of the secondary bag with the outside of the secondary bag to enclose the portions, and folding the open end of a filled secondary bag to enclose the portion of foodstuff therein;
   d. storing the two or more filled secondary bags into at least one primary bag; and
   e. providing the set of instructions with the second package communicating and directing the consumer to perform steps a-d.

2. The method of claim 1 wherein the set of instructions directs the consumer to store the at least one filled primary bag in a freezer, wherein the secondary bags are rectangular shaped to reduce captured air and, in turn, reduce freezer burn.

3. The method of claim 1 wherein a volume of two of the secondary bags combined is less than a volume of each primary bag.

4. The method of claim 1 wherein the gauge of the secondary bags is less than a gauge of the primary bags.

5. The method of claim 1 wherein the plurality of secondary bags is provided in the first package.

6. The method of claim 1 wherein the plurality of secondary bags is provided in a second package.

7. The method of claim 6 wherein the first and second packages are over-wrapped together to provide a unitized product.

8. The method of claim 1 further comprising the step of shaping the portions in the secondary bags.

9. The method of claim 1 wherein the secondary bags are rectangular shaped and the open end adheres to itself as a closure mechanism to reduce captured air.

10. The method of claim 1 wherein the secondary bags are without a closure mechanism.

11. The method of claim 1, further comprising the step of tightly wrapping the portions within the secondary bags to completely enclose, cling to and protect the portions.

12. The method of claim 1, further comprising the step of stretching the secondary bags about the portions within the secondary bags to completely enclose, cling to and protect the portions.

13. The method of claim 1, further comprising the step of providing the secondary bags as a perforated roll.

* * * * *